(No Model.) 2 Sheets—Sheet 1.
M. L. HALL.
CORN PLANTER.
No. 518,840. Patented Apr. 24, 1894.
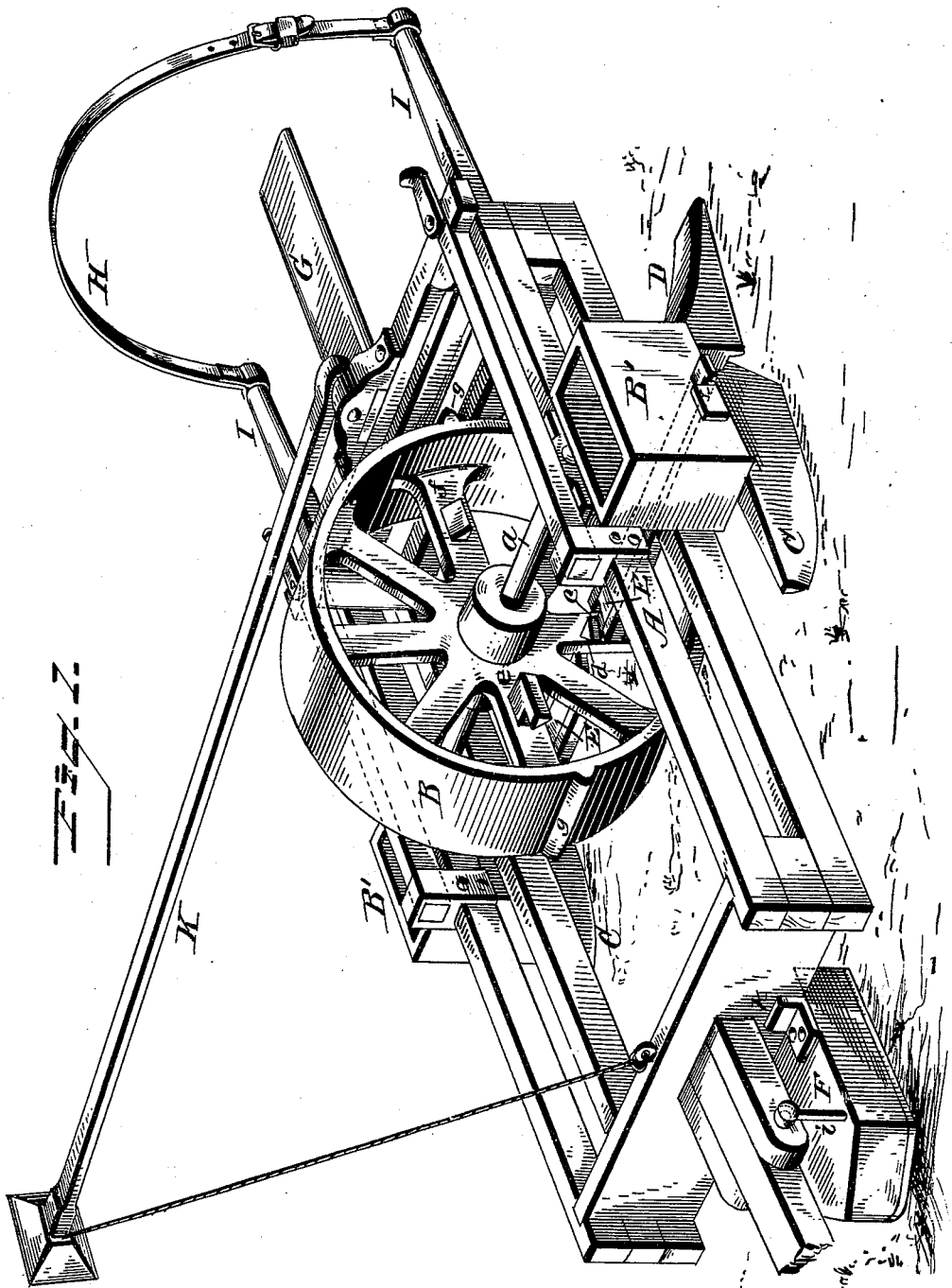

(No Model.) 2 Sheets—Sheet 2.
M. L. HALL.
CORN PLANTER.
No. 518,840. Patented Apr. 24, 1894.
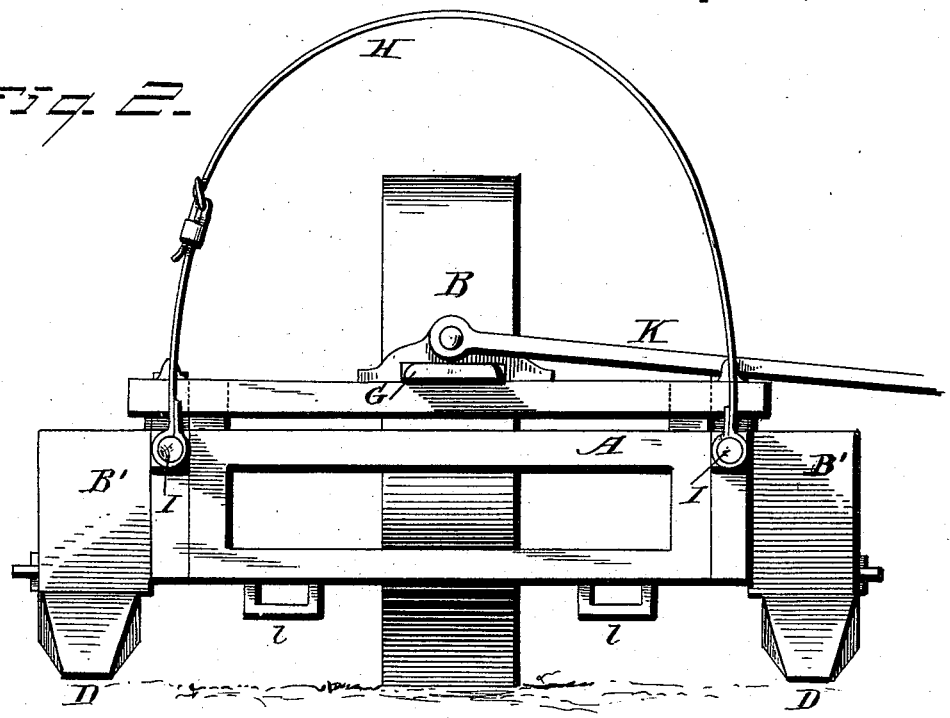
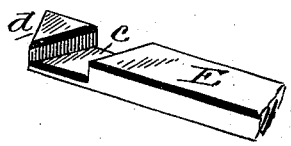
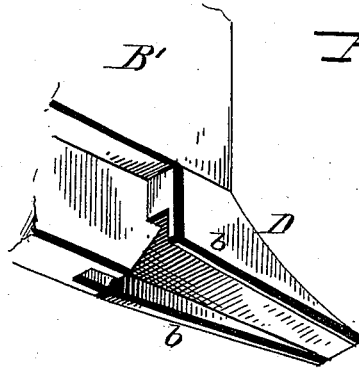
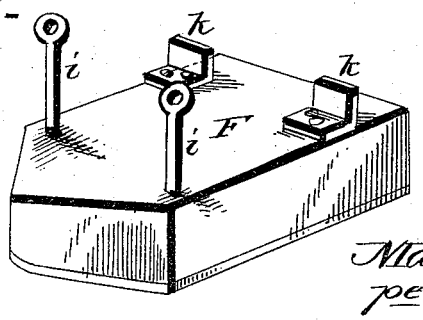
Witnesses
C. J. Williamson
C. M. Browning
Inventor
Marquis L. Hall
per Chas. N. Fowler
Attorney.

UNITED STATES PATENT OFFICE.

MARQUIS L. HALL, OF OMAHA, NEBRASKA.

CORN-PLANTER.

SPECIFICATION forming part of Letters Patent No. 518,840, dated April 24, 1894.

Application filed September 22, 1893. Serial No. 486,240. (No model.)

*To all whom it may concern:*

Be it known that I, MARQUIS L. HALL, a citizen of the United States, residing at Omaha, in the county of Douglas and State of Nebraska, have invented certain new and useful Improvements in Corn-Planters; and I do hereby declare that the following is a full, clear, and exact description of the same, reference being had to the annexed drawings, making a part of this specification, and to the letters of reference marked thereon.

The present invention has for its object to improve the construction of a check-row corn planter in its several details whereby its operation will be materially improved, and a planter provided that will possess both strength and durability and be simple in its construction and easily controlled in its operation. These several objects I attain by the construction substantially as shown in the drawings and hereinafter described and claimed.

Figure 1 of the drawings represents a perspective view of a check row corn planter constructed in accordance with my invention; Fig. 2 a rear end view thereof; Fig. 3 a detail view in perspective of the grooved end of one of the dropping-slides; Fig. 4 a similar view of one of the covers which forces the earth over the corn after it has been dropped; Fig. 5 a perspective view of the float which is attached to the front of the planter.

In the accompanying drawings A represents a suitable frame of desirable form and construction and supported upon the axle $a$ which has its bearings in the sides of the frame and has mounted thereon a single wheel B located centrally in the frame. Upon the outer sides of the frame A are suitable hoppers B' for containing the corn, and under the hoppers are located the furrowing plows C and in the rear thereof are the coverers D. The coverers D are of peculiar construction upon their under side in that they are widest at their front end and gradually diminish in width in a direction toward their rear end, as shown in Fig. 4. The coverers have side flanges $b$ which together with the gradual decrease in width as previously described more effectually force the earth upon the corn and the rear end hanging the lowest, or rather the coverer being on an incline with its rear end at the lowest point will press the earth at the same time it is forced upon the corn.

The dropping slides E which may be of the usual construction, have upon their upper side a groove $c$ extending at an acute angle to the length of the slide, and also at the extremity thereof is an incline bearing face $d$. The wheel B upon its sides has suitable cams $e$ $f$ to engage alternately with the incline groove $c$ and incline bearing face $d$ of the dropping slides E. As the wheel rotates the cam $e$ will engage with the groove $c$ when it comes in contact therewith and draw the slide E in the direction of the wheel and the cam $f$ when brought in engagement with the incline bearing $d$ will force the slide back into position, the slides being operated in like manner upon both sides of the wheel. The periphery of the wheel is provided with suitable markers $g$ to make marks upon the ground as a guide to the driver whereby he is enabled to plant in cross or check rows.

To the front end of the frame A is a float F which is hinged or pivoted in any suitable manner to the hounds $h$ or to any stationary object. The means shown of pivoting or hinging the float is through the medium of eye-rods $i$ through which pins or bolts extend and at the rear of the float are guides $k$ for the end of the frame to come against. This float F will not only force away all obstructions but nicely smooth the ground in the path of the wheel B for its proper working. It should be understood that the float is not rigid but is hinged or pivoted, thereby insuring its more perfectly working and the guides $k$ prevent the strain on the hinge or pivotal connection by the frame bearing forward. The guides also prevent lateral strain on the hinge or pivotal connection by keeping the float in a straight line and guard against lateral displacement of the float.

At the rear of the frame A is a seat G upon which the driver sits and an adjustable strap H is connected at its ends to the handles I so as to pass over the shoulders of the driver, the strap having a suitable buckle by which it may be lengthened or shortened to adapt it to men of different heights or to boys. As the driver rises from his seat, the strap which hangs loosely before him and across his neck and shoulders, will be tightened as he stands upon his feet, just sufficiently to raise the plows and wheel clear from the ground, thus easily enabling him to turn around and to turn the wheel (by hand or foot) in the right position to drop the corn in line, when he sits down and starts onward. Stirrups are provided as shown at *l* for the driver's feet when he is upon the seat G, said stirrups being of any suitable construction and connected in any suitable manner to the rear end of the frame A.

The usual marker K of any preferred construction may be connected to the frame of the planter and is used in the ordinary manner.

Having now fully described my invention, what I claim as new, and desire to secure by Letters Patent, is—

1. A corn-planter provided with dropping slides having at their inner ends incline slots or grooves and at their extremities inclined bearings, and cams upon the sides of the wheel to act alternately upon the grooves and incline bearing faces, substantially as and for the purpose set forth.

2. A corn-planter provided with a float hinged or pivoted to its front end and having guides upon the rear end of the float, substantially as and for the purpose specified.

3. In a corn-planter, seed dropping slides having inclined grooves and inclined bearing shoulders at one end, cams upon the wheel to act therewith in operating the slides, a pivoted or hinged float at the front end of the planter, markers upon the periphery of the wheel, and an adjustable strap at the rear end of the planter and adapted to pass over the shoulders of the driver, substantially as and for the purpose described.

In testimony that I claim the above I have hereunto subscribed my name in the presence of two witnesses.

M. L. HALL.

Witnesses:
JOHN L. McCAGUE,
ALEX. G. CHARLTON.